United States Patent [19]

Robinson et al.

[11] 4,339,371

[45] Jul. 13, 1982

[54] HIGH CONCENTRATION WATER-SOLUBLE POLYMERS IN WATER-IN-OIL EMULSIONS

[75] Inventors: Peter M. Robinson, Milford; David H. Rakowitz, Cos Cob; Lesley J. Nowakowski, Shelton, all of Conn.

[73] Assignee: American Cyanamid Company, Stamford, Conn.

[21] Appl. No.: 245,793

[22] Filed: Mar. 20, 1981

Related U.S. Application Data

[63] Continuation-in-part of Ser. No. 193,517, Oct. 2, 1980, abandoned.

[51] Int. Cl.³ ............................................. C08L 33/00
[52] U.S. Cl. .................................. 524/310; 524/458; 524/460; 524/517

[58] Field of Search ............. 260/29.6 RW, 29.6 WB, 260/29.6 WQ

[56] References Cited

U.S. PATENT DOCUMENTS

| | | | |
|---|---|---|---|
| 3,256,233 | 6/1966 | Hahn | 260/29.6 RW |
| 3,380,944 | 4/1968 | Kay | 260/29.6 RW |
| 3,806,485 | 4/1974 | Frisque | 260/29.6 NR |

*Primary Examiner*—Paul R. Michl
*Attorney, Agent, or Firm*—Michael J. Kelly; William H. Calnan; Bruce F. Jacobs

[57] ABSTRACT

Water-in-oil emulsions containing high concentrations of water-soluble polymers are prepared by incorporating therein an oil-soluble, water-insoluble polymeric surfactant prepared from maleic anhydride and a comonomer.

26 Claims, No Drawings

HIGH CONCENTRATION WATER-SOLUBLE POLYMERS IN WATER-IN-OIL EMULSIONS

This application is a continuation-in-part of our prior U.S. application Ser. No. 193,517, filed Oct. 2, 1980 and now abandoned.

This invention relates generally to water soluble polymers dispersed in water-in-oil emulsions. More particularly, the present invention relates to stable water-in-oil emulsions which contain a high concentration of finely dispersed water-soluble polymeric particles and an oil-soluble, water-insoluble polymeric surfactant therein. The stability at the high concentration is made possible by the use of the polymeric surfactants of this invention.

Water-in-oil emulsions having water-soluble polymers dispersed therein are well known in the art. Such emulsions have found a wide variety of uses, for example, as flocculants in the mining industry and in sewage treatment, and as mobility control agents in enhanced oil recovery. However, commercially available stable emulsions have a relatively low polymeric solids content. Accordingly, large volumes of these emulsions must be used, and shipment and storage costs are high.

Heretofore, the most successful method of dealing with this problem was to concentrate low solids emulsions following their preparation. Various concentration processes are disclosed in U.S. Pat. Nos. 3,849,361, 4,021,399 and 4,052,353. However, each of these processes necessitates the additional costly step of concentrating the emulsion. Thus it would be an advancement in the art if stable emulsions containing high concentrations of polymeric solids could be prepared without the requirement of such additional step.

It is, accordingly, an object of the instant invention to provide a method to directly prepare a high polymeric solids content water-in-oil emulsion which possesses excellent stability.

Other objects will become apparent from the ensuing description.

It has been discovered that the addition of certain oil-soluble, water-insoluble polymeric surfactants will permit the water-soluble polymeric solids content in a water-in-oil emulsion to be increased from the current levels of from 20% to 30% to from about 40% to 60% based upon the total emulsion weight, i.e. water, oil and polymer, without the necessity of concentrating the emulsion to achieve this result. The emulsions possess excellent mechanical stability. The emulsions also show significantly improved stability to sedimentation and to inorganic salt breaking which is a problem when the emulsions are produced on a commercial scale using industrial machinery and in industrial use. The oil-soluble, water-insoluble polymeric surfactant of the present invention has the general formula:

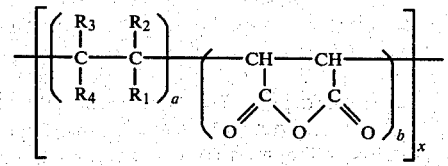

wherein x is a whole number greater than about 5, the mole ratio of a:b is from 3:1 to 1:3, provided the HLB number is maintained at less than about 14, preferably less than about 10; and $R_1$, $R_2$, $R_3$ and $R_4$ are each independently hydrogen, alkyl ($C_{1-48}$), alkoxy ($C_{1-48}$), alkenyl ($C_{2-48}$), aryl ($C_{6-12}$) or alkaryl ($C_{7-12}$) with the proviso that $R_1$, $R_2$, $R_3$ and $R_4$ are such that the polymeric surfactant is oil-soluble and water-insoluble.

Preferred surfactants correspond to the above formula wherein x is about 100 to 400, the ratio of a:b is about 1:1, $R_1$, $R_2$ and $R_3$ are hydrogen and $R_4$ is $C_{16}H_{33}$ or $C_{12}H_{24}$.

The polymeric surfactant may be prepared in any suitable manner, generally by reacting maleic anhydride with an appropriate comonomer. Such preparation may, for example, be conducted in the manner disclosed in U.S. Pat. No. 3,732,337, which is incorporated herein by reference. It is to be noted, however, that the particular method of preparing the polymeric surfactant does not constitute a feature of this invention. Such a material is available as, for example, PA-18 or PA-14 from Gulf.

The polymeric surfactant is added to the emulsion in an amount effective to stabilize the same. Preferably, the polymeric surfactant is present in an amount equal to from about 0.1 to 3 percent, by weight, based on the total emulsion weight. Most preferably, the polymeric surfactant is present in an amount equal to from about 0.15 to 1 percent, by weight, based on the total emulsion weight.

Also within the scope of the above definition of the polymeric surfactant are suitable oil-soluble, water-insoluble derivatives thereof. As this is obvious to those skilled in the art, such derivatives may be prepared by reaction of the polymeric surfactant with, for example, an alcohol or an amine. British Pat. No. 1,093,081 discloses the use of a surfactant similar to a cationic derivative of this invention as a dispersing agent for fine particles in non-aqueous solvents.

It has been further discovered that the stability of the high polymeric solids content water-in-oil emulsions may be more greatly enhanced when the hereinabove described polymeric surfactant is used in conjunction with a secondary oil-soluble, water-insoluble polymeric surfactant which is a linear ABA block copolymer of polyester-polyalkylene oxide-polyester wherein the alkylene oxide content is less than about 40 percent, by weight. Preferably, the alkylene oxide content is about 30 percent. Examples of such copolymers are disclosed in U.S. Pat. No. 4,203,877, incorporated herein by reference.

When the secondary polymeric surfactant is used, it is present in an amount effective to enhance the stability of the emulsion. Generally, it is present in an amount equal to from about 0.1 to 3 percent by weight, based on the total emulsion weight. Preferably, it is present in an amount equal to from about 0.15 to 1 percent by weight, based on the total emulsion weight. It is noted that, when the two polymeric surfactants are employed, the total amount of these surfactants generally does not exceed about 3 percent, by weight, of the emulsion. However, more may be used.

Either or both of the polymeric surfactant, and the secondary polymeric surfactant of this invention may be added prior to polymerization, during polymerization, or after polymerization if the system has not previously gelled. Preferably the polymeric surfactant is added prior to polymerization as it has been found to allow the use of higher polymerization temperatures.

The emulsion of the instant invention is so termed because the diameters of the dispersed water-soluble polymeric particles range generally from 0.1 to 10 microns, with about 95% of the particles measuring from about 0.7 to 2.5 microns in diameter. This is to be contrasted with a suspension, such as that which is the subject of British Pat. No. 1,329,062, wherein the particle diameters range generally up to 150 microns. Commercial suspensions normally have particle sizes in the 30 to 150 micron range.

Although the present invention has been found to be independent of the particular emulsion polymerization method employed, certain preferences are delineated in the general description of emulsion preparation which follows:

A preliminary emulsion is made by homogenizing oil and aqueous phases. The oil phase of the emulsion, which generally comprises from about 5 to 40 percent by weight of the emulsion, is comprised of one or more inert hydrophobic liquids. Preferably, the oil phase comprises from about 20 to 30 percent of the emulsion. The oil used may be selected from a large class of organic liquids which are immiscible with water, including liquid hydrocarbons and substituted liquid hydrocarbons. As representative examples there may be mentioned benzene, xylene, toluene, mineral oils, kerosenes, napthas, chlorinated hydrocarbons, such as perchloroethylene, and the like.

The oil phase also contains one or more conventional emulsion polymerizaton stabilizers. Such stabilizers are well known to the art, and those preferred for water-in-oil emulsions include the sorbitan esters. The most preferred conventional stabilizer is sorbitan mono-oleate. The conventional stabilizer is present in an amount sufficient to stabilize the emulsion during polymerization. Although the amount will vary depending upon, inter alia, the monomers used and polymerization conditions, generally from about 0.5 to 5.0 percent by weight, based upon the total emulsion weight, is used. The emulsion polymerization stabilizer by itself, even in an increased amount, has been found incapable of stabilizing a resultant emulsion having about 40 to 60% solids.

The aqueous phase generally comprises from about 95 to 60 percent, by weight, of the emulsion. Preferably, it comprises from about 80 to 70 percent thereof. In addition to the water, the aqueous phase contains the desired monomers to be polymerized, in an amount equal to from about 40 to 60% by weight, based on the total weight of the emulsion, and generally a chain transfer agent and an initiator. Alternatively, the chain transfer agent and/or the initiator may be added to the system after the preliminary emulsion has been prepared. The initiator may also be added continuously during polymerization to control the rate of polymerization depending upon the particular monomers used and their reactivity. Further alternatively, the initiator may be present in either phase with the monomers being added either continuously or incrementally thereafter. Or the initiator and the monomers may all be added to the preliminary emulsion.

Any monomers which, when polymerized or copolymerized, yield water-soluble polymers, may be used in the present invention. The term "water-soluble" means that the polymer is soluble in water in an amount of at least 1% by weight. The polymer may be either anionic, non-ionic or cationic. Examples of monomers which yield such water soluble polymers or copolymers include acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, diethylaminoethyl acrylate methylsulfate, dimethylaminoethyl methacrylate methylchloride quaternary, styrene, acrylonitrile, 2-acrylamido-2-methylpropane sulfonic acid and its salts, 3-(methylacrylamido)propyl-trimethylammonium chloride, vinyl methyl ether, vinyl ethyl ether, alkali metal and ammonium salts of vinyl sulfonic acid, vinyl pyridine, vinyl pyrrolidone, vinyl imidazole, diallyl dimethylammonium chloride and the like. Preferably, the monomers are selected from acrylamide, acrylic acid and its salts, a quaternary of dimethylaminoethylmethacrylate, and 3-(methylacrylamido)propyl-trimethylammonium chloride. Most preferably, the polymer is polyacrylamide, polyacrylic acid, or a copolymer of acrylamide and acrylic acid.

Generally, an anionic polymeric surfactant is used when the water soluble polymer is anionic, and a cationic polymeric surfactant is employed when the water-soluble polymer is cationic. A non-ionic polymeric surfactant may be utilized for any type of water-soluble polymer. However, it is not critical that this practice be followed. Again, routine experimentation will determine optimum combinations.

Any conventional chain transfer agent may be employed, such as propylene glycol, isopropanol, 2-mercaptoethanol, dodecyl mercaptan and thioglycolic acid. The chain transfer agent is generally present in an amount equal to from about 0.1 to 10.0 percent, by weight, based on the total emulsion weight. However, more of the chain transfer agent may be added.

The initiator may be any free radical producing material well known in the art. The preferred free radical initiators are the peroxide-type polymerization initiators and the azo-type polymerization initiators. Generally the amount of initiator utilized is from about 0.0005 to 0.5 percent by weight, based upon the total emulsion weight. Radiation may also be used to initiate the reaction, if desired.

A sequestering agent may also be present in the aqueous phase. Although the preferred sequestering agent is ethylenediamine tetraacetic acid (EDTA), other sequestering agents, such as pentasodium diethylenetriamine pentaacetate, may be employed. Usually from about 0.01 to 2.0 percent by weight based on the weight of the emulsion, of the sequestering agent is added, although more may be used.

Following preparation of the preliminary emulsion, polymerization of the monomers is commenced at a temperature sufficiently high to break down the initiator to produce the desired free radicals. Generally a suitable range of temperatures is about −20° C. to 200° C., with preferred temperatures about 20° C. to 100° C.

Preferably the polymerization is run at a pH of about 2-12, and a suitable amount of ammonia or other base, or acid, may be added to the preliminary emulsion to achieve the desired pH. The polymerization is usually completed in from about an hour or two to several days, depending upon the monomers employed and other reaction variables. It is generally carried out at atmospheric pressure, but super-atmospheric pressure is advantageously used when volatile ingredients are involved.

Following completion of the polymerization, the pH of the emulsion may be adjusted as desired. For an anionic polymer emulsion, this is generally about 4–10. For a cationic polymer emulsion, this is typically about 3–5. For a non-ionic polymer emulsion, it is about 3–7. A breaker surfactant may also be added to yield a single package final product. Any suitable breaker surfactant may be employed, experimentation being the best means of determining which breaker surfactant will perform optimally with a given emulsion system. A preferred breaker surfactant is a compound prepared by reacting ethylene oxide with nonyl phenol. Typically, the breaker surfactant is added in an amount equal to from about 0.5 to 5.0 percent by weight, based on the total emulsion weight. Preferably, from about 1.5 to 3.5 percent of the breaker surfactant is added.

Once prepared, the emulsions of the present invention may be chemically modified in any known manner. The term chemically modified is intended to cover further treatment of the dispersed water-soluble polymer and/or the addition of components to the dispersed water-soluble polymer which, without the stabilization provided by the oil-soluble, water-insoluble polymeric surfactants of the present invention, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The following examples are illustrative of the present invention, but are not in any way a limitation thereof. All parts and percentages are by weight unless otherwise specified.

EXAMPLE 1

A water phase containing 173.9 g. of acrylamide, 75.4 g. of acrylic acid, about 19 g. of ammonia, 5.2 g. of propylene glycol, 0.48 g. of the disodium salt of ethylene diaminetetraacetic acid, and 0.008 g. of tertiary butyl hydroperoxide in 138.6 g. of water (for a total aqueous phase of 412.6 g.) and an oil phase containing 143.1 g. oil, 11.4 g. of sorbitan mono-oleate and 2.85 g. of an oil-soluble, water-insoluble polymeric surfactant having the formula:

$$\left[\left(\begin{array}{cc}R_3 & R_2 \\ | & | \\ C-C \\ | & | \\ R_4 & R_1\end{array}\right)_a \left(\begin{array}{c}CH-CH \\ | \quad | \\ C \quad C \\ \diagdown O \diagup \diagdown O \diagup \diagdown O\end{array}\right)_b\right]_x$$

where x is about 100 to 400, the ratio of a:b is 1:1, $R_1$, $R_2$ and $R_3$ are hydrogen, and $R_4$ is $C_{16}H_{33}$ (for a total oil phase of 157.35 g.) were homogenized. The resulting emulsion system was then transferred to a suitable reaction vessel with stirring and sparged with $N_2$. As 0.5 cc/hr of a 0.36% solution of sodium metabisulfite was added for 4 to 5 hours, the temperature of the emulsion increased to about 50° C., and agitation was maintained for 5 to 6 hours, polymerization being completed at the end of that time.

The water-soluble polymeric solids content of the emulsion product was about 46 percent by weight.

In the following examples, emulsions were prepared generally in accordance with the procedure outlined in Example 1, but with the water-soluble polymeric content changed as indicated. Also, in each instance a breaker surfactant, prepared by reacting ethylene oxide with nonyl phenol, was added to the final emulsion to yield a one package product. (Such an addition is commonly made in commercial preparation so that less work is involved on the consumer's part to ready the emulsion for use.)

In each Example, the emulsions were stirred at room temperature and a given emulsion's resistance to gellation under those circumstances is the measurement of its mechanical stability.

EXAMPLE 2

Emulsions were prepared containing about 46 percent, by weight, of water-soluble polymeric solids (as a 70/30 acrylamide/ammonium acrylate copolymer), and having oil phases with the characteristics set out in Table I. Also included is the mechanical stability determined for each emulsion.

It is seen from Table I that the use of the polymeric surfactant of the instant invention renders the resultant emulsion significantly more stable than when either sorbitan mono-oleate is the lone surfactant or sorbitan monolaurate is used as cosurfactant.

EXAMPLE 3

Emulsions were prepared containing water-soluble polymeric solids as in Example 2 but having oil phases with the characteristics set out in Table II. As can be seen from the results shown, the polymeric surfactant of the present invention greatly enhanced the mechanical stability of the emulsions prepared therewith.

EXAMPLE 4

Emulsions were prepared containing about 44 percent, by weight, of water-soluble polyacrylamide solids (the polymer being a homopolymer of acrylamide) and having oil phases with the characteristics set out in Table III. The results are self-explanatory.

TABLE I

|  | Emulsion A | Emulsion B | Emulsion C | Emulsion D | Emulsion E |
|---|---|---|---|---|---|
| Oil Phase* | 21.9 | 21.9 | 27.3 | 21.9 | 27.7 |
| Oil Phase Components* |  |  |  |  |  |
| Oil | 18.9 | 18.9 | 23.8 | 18.9 | 25.1 |
| Sorbitan Mono-oleate | 2.0 | 1.5 | 3.5 | 2.0 | 2.0 |
| Sorbitan Monolaurate | 1.0 | 1.5 | — | — | — |
| Polymeric Surfactant of Example 1 | — | — | — | 1.0 | 0.5 |
| Mechanical Stability | 4 hrs. | gelled during polymerization | 3–5 hrs. | 1000 hrs. | 1000 hrs. |

*expressed as percentages of total emulsion weight.

TABLE II

|  | Emulsion F | Emulsion G | Emulsion H | Emulsion I | Emulsion J | Emulsion K |
|---|---|---|---|---|---|---|
| Oil Phase* | 25.8 | 25.8 | 25.8 | 25.8 | 25.8 | 25.8 |

TABLE II-continued

|  | Emulsion F | Emulsion G | Emulsion H | Emulsion I | Emulsion J | Emulsion K |
|---|---|---|---|---|---|---|
| Oil Phase Components* |  |  |  |  |  |  |
| Oil | 23.8 | 22.8 | 22.8 | 23.6 | 23.3 | 22.8 |
| Sorbitan Mono-oleate | 2.0 | 2.0 | 2.0 | 2.0 | 2.0 | 2.0 |
| Sorbitan Trioleate | — | — | 1.0 | — | — | — |
| Sorbitan Monolaurate | — | 1.0 | — | — | — | — |
| Polymeric Surfactant of Example 1 | — | — | — | 0.2 | 0.5 | 1.0 |
| Mechanical Stability | 2-5 hrs. | gelled during polymerization. | 6-17 hrs. | 120-140 hrs. | 1000 hrs. | 1000 hrs |

*expressed as percentages of total emulsion weight.

TABLE III

|  | Emulsion L | Emulsion M |
|---|---|---|
| Oil Phase* | 28.2 | 27.8 |
| Oil Phase Components* |  |  |
| Oil | 25.6 | 25.7 |
| Sorbitan Mono-oleate | 2.0 | 2.0 |
| Polymeric Surfactant of Example 1 | 0.5 | — |
| Mechanical Stability | 600 hrs. | gelled during polymerization |

*expressed as percentage of total emulsion weight.

TABLE IV

|  | Emulsion N | Emulsion O |
|---|---|---|
| Oil Phase* | 27.6 | 27.6 |
| Oil Phase Components* |  |  |
| Oil | 25.0 | 25.0 |
| Sorbitan Mono-oleate | 2.0 | 2.0 |
| Polymeric Surfactant of Example 1 | 0.5 | — |
| Mechanical Stability | 600 hrs. | gelled during polymerization |

*expressed as percentage of total emulsion weight.

EXAMPLE 5

Emulsions were prepared containing about 50.5 percent, by weight, of water-soluble polymeric solids (as ammonium acrylate in a homopolymer of acrylic acid) and having oil phases with the characteristics outlined in Table IV.

EXAMPLE 6

Emulsions having increased solids over those of Example 4, i.e., 47.5 percent, by weight, of water-soluble polymeric solids (the polymer being a homopolymer of acrylamide), and having oil phase contents as set forth in Table V, were prepared. In addition to the polymeric surfactant of Example 1, emulsion R contained a secondary oil-soluble, water-insoluble polymeric surfactant of the present invention which is a linear ABA block copolymer of polyester-polyethylene oxide-polyester, prepared by reacting condensed 12-hydroxystearic acid with polyethylene oxide according to the procedure outlined in U.S. Pat. No. 4,203,877, and containing about 30% by weight, ethylene oxide. This copolymer is available as, for example, Rapisol TM B-246 from Imperial Chemical Industries, Ltd. Emulsion S contained an oil-soluble, water-insoluble polymeric surfactant which is a branched polyester-polyethylene oxide compound, prepared by reacting an alk(en)yl succinic anhydride with polyethylene oxide. This compound is commercially available as, for example, Rapisol A-430 from Imperial Chemical Industries, Ltd.

The results set forth in Table V demonstrate that the polymeric surfactant of this invention is an essential ingredient providing mechanical stability and that when the secondary polymeric surfactant of the present invention (A) is further added to the emulsion, the mechanical stability is even that much more enhanced.

EXAMPLE 7

This example demonstrates the mechanical and sedimentation stabilities of emulsions containing the oil-soluble, water-insoluble polymeric surfactant alone and the polymeric surfactant together with the second oil-soluble, water-insoluble polymeric surfactant.

TABLE V

|  | Emulsion P | Emulsion Q | Emulsion R | Emulsion S |
|---|---|---|---|---|
| Oil Phase* | 25.3 | 25.3 | 25.3 | 25.3 |
| Oil Phase Components* |  |  |  |  |
| Oil | 23.8 | 23.8 | 23.8 | 23.8 |
| Sorbitan Mono-oleate | 1.5 | 1.0 | 0.5 | 0.5 |
| Polymeric Surfactant of Example 1 | — | 0.5 | 0.5 | 0.5 |
| A | — | — | 0.5 | — |
| B | — | — | — | 0.5 |
| Mechanical Stability | Emulsion not stable prior to polymerization. | 2-12 hrs. | 50-100 hrs. | 2-12 hrs. |

*expressed as percentage of total weight.

Emulsions containing about 46.5 percent, by weight, of water-soluble polymeric solids (as a 70/30 acrylamide/ammonium acrylate copolymer) and having oil phase contents as set forth in Table VI were prepared.

The data in Table VI shows that the combination of the instant invention's polymeric surfactant with secondary polymeric surfactant A not only provided the emulsion with excellent mechanical stability (as did the polymeric surfactant by itself), but also resulted in a smaller water-soluble polymeric particle size and no oil phase separation after two months. When used without the polymeric surfactant, however, the secondary polymeric surfactant A did not work.

EXAMPLE 8

The method of preparing the emulsion set forth in Example 1 is repeated in every detail except that the oil-soluble, water-insoluble polymeric surfactant of this invention is not present in the preliminary emulsion.

Instead, it is added during the polymerization of the monomers. Similar results are obtained.

EXAMPLE 9

The procedure of Example 1 is repeated except the polymeric surfactant is replaced by other oil-soluble water-insoluble polymeric surfactants as per the formula:

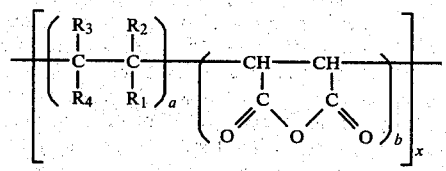

wherein $R_1$, $R_2$, $R_3$, $R_4$, $x$ and the ratio of a:b were as follows:

TABLE VI

|  | Emulsion T | Emulsion U | Emulsion V |
|---|---|---|---|
| Oil Phase* | 23.7 | 23.7 | 23.7 |
| Oil Phase Components* |  |  |  |
| Oil | 19.7 | 19.7 | 19.7 |
| Sorbitan Mono-oleate | 2.0 | 2.0 | 2.0 |
| Polymeric Surfactant of Example 1 | — | 1.0 | 2.0 |
| A | 2.0 | 1.0 | — |
| Mechanical Stability | gelled during polymerization | 100 hrs. | 100 hrs. |
| Particle Size (95% of particles within range) |  | 0.8–1.5 microns | 0.8–2.3 microns |
| Separation of oil after two (2) months |  | no separation | 8% by volume |

*expressed as percentage of total emulsion weight.

| $R_1$ | $R_2$ | $R_3$ | $R_4$ | $x$ | a:b |
|---|---|---|---|---|---|
| $CH_3$ | H | H | $C_8H_{17}$ | 100 | 2:1 |
| H | $C_{10}H_{21}$ | $C_2H_5$ | H | 8 | 1:2 |
| $C_2H_5$ | $CH_3$ | $OCH_3$ | $C_{12}H_{25}$ | 400 | 1:1 |
| H | (phenyl) | $C_{22}H_{45}$ | H | 700 | 1:3 |

In each case, substantially similar stabilized emulsions having 40 to 60% water-soluble polymeric solids result.

EXAMPLE 10

The procedure of Example 1 is repeated except that the monomers are replaced with equal amounts of (a) 95:5 mole percent acrylamide:dimethylaminoethyl methacrylate methylchloride quaternary, which yields a cationic water-soluble polymer, and the temperature of polymerization is raised to 60° C.;

(b) 100 mole percent acrylic acid, yielding an anionic water-soluble polymer; and (c) 100 mole percent methacrylamide, yielding a nonionic, water-soluble polymer and the polymeric surfactant is derivatized (but remains non-ionic, oil-soluble and water-insoluble) by reacting it with methanol for about 5 hours at about 120° C.

Stable emulsions result in each instance.

EXAMPLE 11

The procedure of Example 1 is repeated except that the monomers used are 90 mole percent acrylamide and 10 mole percent 3-(methacrylamido)propyl-trimethylammonium chloride (the resultant water-soluble polymer being cationic), and the oil-soluble, water-insoluble polymeric surfactant is made cationic by derivatization with diethylenetriamine by reacting diethylene triamine with it under reflux conditions for 4 to 6 hours at about 200° C.

A stable emulsion results.

Numerous modifications and variations of the present invention are possible in light of the foregoing disclosure and, therefore, within the scope of the appended claims, the invention may be practiced otherwise than is particularly described.

What is claimed is:

1. A stable water-in-oil emulsion comprised of from about 40 to 60% by weight, based on the total weight of the emulsion, of a water-soluble polymer, and an oil-soluble, water-insoluble, polymeric surfactant, in an amount sufficient to stabilize the emulsion, said polymeric surfactant having the formula:

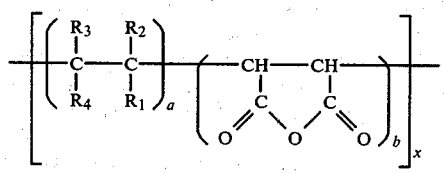

wherein $x$ is a whole number greater than about 5, the mole ratio of a:b is from 3:1 to 1:3, provided the HLB number is maintained at less than about 14, $R_1$, $R_2$, $R_3$ and $R_4$ are independently selected from the group consisting of hydrogen, alkyl ($C_1$–$C_{48}$), alkoxy ($C_{1-48}$), alkenyl ($C_{2-48}$), aryl ($C_{6-12}$), alkaryl ($C_{7-12}$), and $R_1$, $R_2$, $R_3$, and $R_4$ are such that the surfactant is oil-soluble and water-insoluble.

2. The emulsion of claim 1 wherein the HLB number is less than about 10.

3. The emulsion of claim 1 wherein $x$ is about 100 to 400, the mole ratio of a:b is 1:1, $R_1$, $R_2$ and $R_3$ are each hydrogen and $R_4$ is $C_{16}H_{33}$.

4. The emulsion of claim 1 wherein said water-soluble polymer is a polymer or copolymer comprised of monomers selected from acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, diethylaminoethyl acrylate methylsulfate, dimethylaminoethyl methacrylate methylchloride quaternary, styrene, acrylonitrile, 2-acrylamido-2-methylpropane sulfonic acid and its salts, 3-(methylacrylamido)propyl-trimethylammonium chloride, vinyl methyl ether, vinyl ethyl ether, vinyl pyridine, vinyl pyrrolidone, vinyl imidazole, diallyldimethylammonium chloride, or mixtures thereof.

5. The emulsion of claim 1 wherein said water soluble polymer is comprised of monomers selected from the group consisting of acrylamide, acrylic acid and its salts, a quaternary of dimethylaminoethylmethacrylate, and 3-(methylacrylamido)propyl-tri-methylammonium chloride.

6. The emulsion of claim 5 wherein said water soluble polymer is comprised of acrylamide, acrylic acid and its salts, or mixtures thereof.

7. The emulsion of claim 1 wherein the polymeric surfactant is present in an amount of about 0.1 to 3.0% by weight, based on the total weight of the emulsion.

8. The emulsion of claim 1 wherein the polymeric surfactant is present in an amount of about 0.15% to 1.0% by weight, based on the total weight of the emulsion.

9. The emulsion of claim 1 further containing a second oil-soluble, water-soluble polymeric surfactant which is a linear ABA block copolymer of polyester-polyalkylene oxidepolyester, wherein the alkylene oxide content is less than about 40% by weight, based on the weight of the copolymer, in an amount effective to enhance the stability of said emulsion.

10. The emulsion of claim 9 wherein the alkylene oxide content is about 30% by weight.

11. The emulsion of claim 9 wherein the second polymeric surfactant is prepared by reacting condensed 12-hydroxystearic acid with polyethylene oxide and contains about 30% by weight, based on the weight of the copolymer, of ethylene oxide.

12. The emulsion of claim 9 wherein the second polymeric surfactant is present in an amount of about 0.1 to 3.0% by weight, based on the total weight of the emulsion.

13. The emulsion of claim 9 wherein the second polymeric surfactant is present in an amount of about 0.15 to 1.0% by weight, based on the total weight of the emulsion.

14. The emulsion of claim 1 wherein said water soluble polymer is comprised of acrylamide, acrylic acid and its salts, or mixtures thereof, and the emulsion contains sorbitan mono-oleate as an emulsion polymerization stabilizer, the polymeric surfactant wherein x is about 100 to 400, the ratio of a:b is 1:1, $R_1$, $R_2$ and $R_3$ are each hydrogen and $R_4$ is $C_{16}H_{33}$, propylene glycol as a chain transfer agent, ethylenediamine tetra-acetic acid as a sequestering agent, and tertiary-butylhydroperoxide as a polymerization initiator optionally activated by sodium metabisulfite.

15. The emulsion of claim 14 further containing a second oil-soluble, water-insoluble polymeric surfactant which is a linear ABA block copolymer prepared by reacting condensed 12-hydroxystearic acid with polyethylene oxide and containing about 30% by weight, based on the weight of the copolymer, of ethylene oxide.

16. In a process for preparing a stable water-in-oil emulsion containing a water soluble polymer by emulsion polymerization of monomers in the presence of an amount of an emulsion polymerization stabilizer sufficient to stabilize such emulsion during polymerization, the improvement which comprises increasing the monomer content to about 40 to 60% by weight based on the total weight of the emulsion, and incorporating into the emulsion an oil-soluble, water-insoluble polymeric surfactant, in an amount sufficient to stabilize the product emulsion, said polymeric surfactant having the formula:

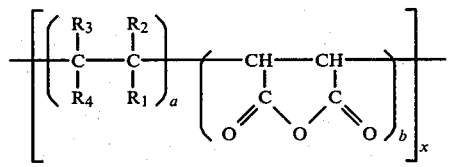

wherein x is a whole number greater than about 5, the ratio of a:b is from 3:1 to 1:3, provided the HLB number is maintained at less than about 14, $R_1$, $R_2$, $R_3$ and $R_4$ are independently selected from the group consisting of hydrogen, alkyl ($C_{1-48}$), alkoxy ($C_{1-48}$), alkenyl ($C_{2-48}$), aryl ($C_{6-12}$) and alkaryl ($C_{7-12}$), and $R_1$, $R_2$, $R_3$ and $R_4$ are such that the surfactant is oil-soluble and water-insoluble.

17. The process of claim 16 wherein the polymeric surfactant is present in an amount of about 0.1 to 3.0% by weight, based on the total weight of the emulsion.

18. The process of claim 16 wherein the polymeric surfactant is present in an amount of about 0.15 to 1.0% by weight, based on the total weight of the emulsion.

19. The process of claim 16 further comprising the addition of a second oil-soluble, water-insoluble polymeric surfactant, which is a linear ABA block copolymer of polyester-polyalkylene oxide-polyester wherein the alkylene oxide content is less than about 40% by weight, based on the weight of the copolymer.

20. The process of claim 16 or 19 wherein x is about 100 to 400, the ratio of a:b is 1:1, $R_1$, $R_2$ and $R_3$ are each hydrogen and $R_4$ is $C_{16}H_{33}$.

21. The process of claim 16 wherein the polymeric surfactant is added to the emulsion prior to polymerization.

22. The process of claim 16 wherein the polymeric surfactant is added to the emulsion during polymerization.

23. The process of claim 16 wherein the polymeric surfactant is added to the emulsion following polymerization.

24. The process of claim 19 wherein the second polymeric surfactant is added to the emulsion prior to polymerization.

25. In a water-in-oil emulsion wherein one or more monomers are polymerized in the presence of an emulsion polymerization stabilizer to produce a water soluble polymer in such emulsion, the improvement which comprises increasing the monomer content in the emulsion to about 40 to 60% by weight, based on the total weight of the emulsion, and incorporating therein an oil-soluble, water-insoluble polymeric surfactant having the formula:

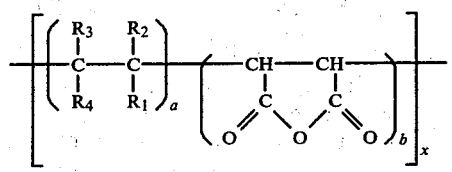

wherein x is a whole number greater than about 5, the ratio of a:b is from 3:1 to 1:3, provided the HLB number is maintained at less than about 14, $R_1$, $R_2$, $R_3$ and $R_4$ are independently selected from the group consisting of hydrogen, alkyl ($C_{1-48}$), alkoxy ($C_{1-48}$), alkenyl ($C_{2-48}$), aryl ($C_{6-12}$) and alkaryl ($C_{7-12}$) and $R_1$, $R_2$, $R_3$ and $R_4$ are such that the surfactant is oil-soluble and water-insoluble.

26. The emulsion of claim 25 comprising further incorporating of a second oil-soluble, water-insoluble polymeric surfactant, which is a linear ABA block copolymer of polyester-polyalkylene oxide-polyester wherein the alkylene oxide content is less than about 40% by weight, based on the weight of the copolymer, in an amount effective to enhance the stability of said emulsion.

* * * * *